US007954572B2

(12) United States Patent
Sorg et al.

(10) Patent No.: US 7,954,572 B2
(45) Date of Patent: Jun. 7, 2011

(54) STEERING SYSTEM FOR TRACKED VEHICLES

(75) Inventors: Johannes Sorg, Ravensburg (DE); Bruno Walter, Tettnang (DE); Notker Amann, Friedrichshafen (DE); Robert Januschevski, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 225 days.

(21) Appl. No.: 12/297,378

(22) PCT Filed: Apr. 5, 2007

(86) PCT No.: PCT/EP2007/053343
§ 371 (c)(1),
(2), (4) Date: Oct. 16, 2008

(87) PCT Pub. No.: WO2007/122088
PCT Pub. Date: Nov. 1, 2007

(65) Prior Publication Data
US 2010/0170728 A1 Jul. 8, 2010

(30) Foreign Application Priority Data
Apr. 22, 2006 (DE) .................... 10 2006 018 817

(51) Int. Cl.
*B62D 11/22* (2006.01)
(52) U.S. Cl. .......... 180/6.3; 180/6.28; 180/6.5; 180/6.6; 180/6.32; 180/6.34
(58) Field of Classification Search ................. 180/6.3, 180/6.28, 6.5, 6.6, 6.32, 6.34
See application file for complete search history.

(56) References Cited

U.S. PATENT DOCUMENTS

| 4,702,358 A * | 10/1987 | Mueller et al. ............. 192/13 R |
| 4,914,592 A * | 4/1990 | Callahan et al. ................ 701/41 |
| 5,857,532 A | 1/1999 | Satzler |
| 6,216,806 B1 | 4/2001 | Toms |
| 6,935,445 B2 | 8/2005 | Johnson |
| 7,690,734 B2 * | 4/2010 | Oehme ........................ 303/9.61 |
| 2002/0050739 A1* | 5/2002 | Koepff et al. ............ 303/122.09 |
| 2002/0096374 A1 | 7/2002 | Ryan |
| 2006/0283641 A1 | 12/2006 | Sorg |

FOREIGN PATENT DOCUMENTS

| DE | 25 37 229 | 3/1977 |
| DE | 42 30 534 A1 | 4/1993 |
| DE | 197 51 995 A1 | 5/1998 |
| DE | 100 30 454 A1 | 2/2001 |
| DE | 103 44 711 A1 | 4/2005 |
| DE | 10 2005 027 117 A1 | 12/2006 |
| EP | 1 527 981 A2 | 5/2005 |
| GB | 1 547 298 | 6/1979 |
| WO | WO-2005/039958 A1 | 5/2005 |
| WO | WO-2006/018027 A2 | 2/2006 |

* cited by examiner

*Primary Examiner* — Paul N Dickson
*Assistant Examiner* — Marlon A Arce
(74) *Attorney, Agent, or Firm* — Davis & Bujold, P.L.L.C.

(57) ABSTRACT

A steering system for tracked vehicles having two brake circuits which is activated after a failure of the primary steering mechanism. The steering system includes a steering switch (L) that can be controlled by a steering axle which, in the event of primary steering system failure, acts upon the brakes of the vehicle in such a manner that rotation of the steering axle results in a braking action upon a track on the inside of a curve.

13 Claims, 2 Drawing Sheets

0. OFF
1. TCU1 active
2. TCU2 active

STEERING SYSTEM FOR TRACKED VEHICLES

This application is a national stage completion of PCT/EP2007/053343 filed Apr. 5, 2007, which claims priority from German Application Serial No. 10 2006 018 817.9 filed Apr. 22, 2006.

FIELD OF THE INVENTION

The invention concerns a steering system for tracked vehicles.

BACKGROUND OF THE INVENTION

In tracked vehicles, to drive around a bend the respective track or drive wheels on the inside of the curve are made slower than the track or drive wheels on the outside of the curve.

From the prior art various systems are known in which the brake power is used, in that it is delivered to the track or drive wheels on the inside of the curve.

For example, from DE 10 2005 027 117 A1 by the present applicant an electric drive system for a vehicle with skid steering is known, which comprises two drive machines of the same type, a source of electrical energy, an electronic control device and a left-hand and a right-hand summation transmission which are made as planetary transmissions. One drive machine drives the ring gear of the summation transmission on the left, while the other drive machine drives the ring gear of the summation transmission on the right. The ring gear of the left-hand summation transmission is in drive connection, via a mechanical gear-train, directly with the gear of the right-hand summation transmission, while the ring gear of the right-hand summation transmission is in drive connection, via a second mechanical gear-train, directly with the sun gear of the left-hand summation transmission. In this it is provided that a left-hand sun gear shaft extends through a left-hand hollow shaft toward the middle of the vehicle and a right-hand sun gear shaft extends through a right-hand hollow shaft towards the middle of the vehicle. This makes for a very compact structure.

In addition, from WO 2005/039958 A1 by the present Applicant, an electric drive system for a vehicle with skid steering by a left-hand electric drive mechanism and a right-hand one of the same type is known, which has a diesel engine and generator combination as the source of electrical energy, an electronic control device for the independent control of the speeds of the two drive machines, with a summation transmission on the left and one of the same type on the right. These are made as planetary transmissions, such that the planetary carriers form the drive output and the ring gear of the left-hand summation transmission can be driven directly by the left-hand drive machine and the ring gear of the right-hand summation transmission can be driven directly by the right-hand drive machine, and the ring gear of the left-hand summation transmission is connected directly by a first mechanical gear-train to the sun gear of the right-hand summation transmission and the ring gear of the right-hand summation transmission is connected directly by a second mechanical gear-train to the sun gear of the left-hand summation transmission.

Besides the electro-mechanical drive systems, purely electric and purely mechanical drive systems are also known.

As a rule, the steering function of tracked vehicles is enabled by a "steer-by-wire" system. In this, the safety and functionality of the steering system are particularly important; above all, the entire connection from the steering wheel to the control unit and from the control unit to the electric drive must be functional.

This can be ensured by making all the components of the steering system redundant in such a manner that if an individual component fails, the overall function of the steering can still be ensured. Disadvantageously, however, it is very expensive to do that since in some cases threefold redundancy is needed in order to recognize which system is not working properly.

The purpose of the present invention is to indicate a steering system for tracked vehicles, which provides a redundant steering possibility for tracked vehicles that is activated in the event of failure of the primary steering mechanism. In addition, the steering system according to the invention should be of inexpensive and simple structure and should be capable of integration into already existing steering systems.

This fall-back level only becomes active if a failure or malfunction of the main steering system occurs, and otherwise has no function during regular operation.

SUMMARY OF THE INVENTION

Accordingly, a steering system for tracked vehicles, comprising two brake circuits, is proposed, which comprises a steering valve controlled by the steering axle which, if the primary steering system fails, acts upon the brakes of the vehicle in such a manner that turning the steering axle results in a braking effect on the track on the inside of the curve.

In the context of an embodiment of the invention, the steering valve can be actuated by way of two cut-off valves which are opened by spring force and closed electrically, such that in the open condition the cut-off valves act in each case on the brake device on one side of the vehicle. In this case, the steering system can be actuated electrically by interrupting the supply voltage to the cut-off valves. Furthermore, the cut-off valves are electrically connected to two electric emergency steering function switches with a mechanical holding function connected in series, such that these emergency steering function switches can be actuated by a high torque on the steering wheel respectively in one direction or the other to enable mechanical activation of the steering system.

According to an advantageous embodiment of the invention, the controllable steering valve can be actuated by way of two first cut-off valves which are opened by spring force and closed electrically, each acting on a respective brake circuit of the vehicle and two further cut-off valves are provided, with each being respectively arranged in a brake circuit. These are closed by spring force and opened electrically which, in the closed condition, de-activate the respective half of the brake circuit so that the first cut-off valves are enabled to act in their open condition each respectively on the brake mechanism on one side of the vehicle.

Here, all the cut-off valves are electrically connected to two electric emergency steering, function switches with a mechanical holding function connected in series, which can be actuated by a high torque on the steering wheel in one direction or the other.

Failure of the primary steering system of a tracked vehicle can be caused by the following faults:
  failure of the control electronics or the on-board electric supply system,
  failure of the electric drive components, such as an electric motor or a drive sum adjustor, or
  failure of the mechanical drive components such as a transmission.

According to the invention, the steering system of the invention is actuated by interrupting the voltage supplied to the four cut-off valves described. This is done electrically or mechanically.

Electrical actuation takes place when the emergency steering function switches are no longer supplied with voltage by the control unit because the control unit has detected a failure in the primary steering system, the on-board electric supply has failed, or the control unit itself has failed so that the voltage supply to the emergency steering function switches is interrupted.

Mechanical actuation takes place when the driver turns the steering wheel with a high torque because there is no steering action, whereby the emergency steering function switches are opened and the current supply to the cut-off valves is interrupted.

BRIEF DESCRIPTION OF THE DRAWINGS

The invention will now be described, by way of example, with reference to the accompanying drawings in which.

DETAILED DESCRIPTION OF THE INVENTION

Figure 1:
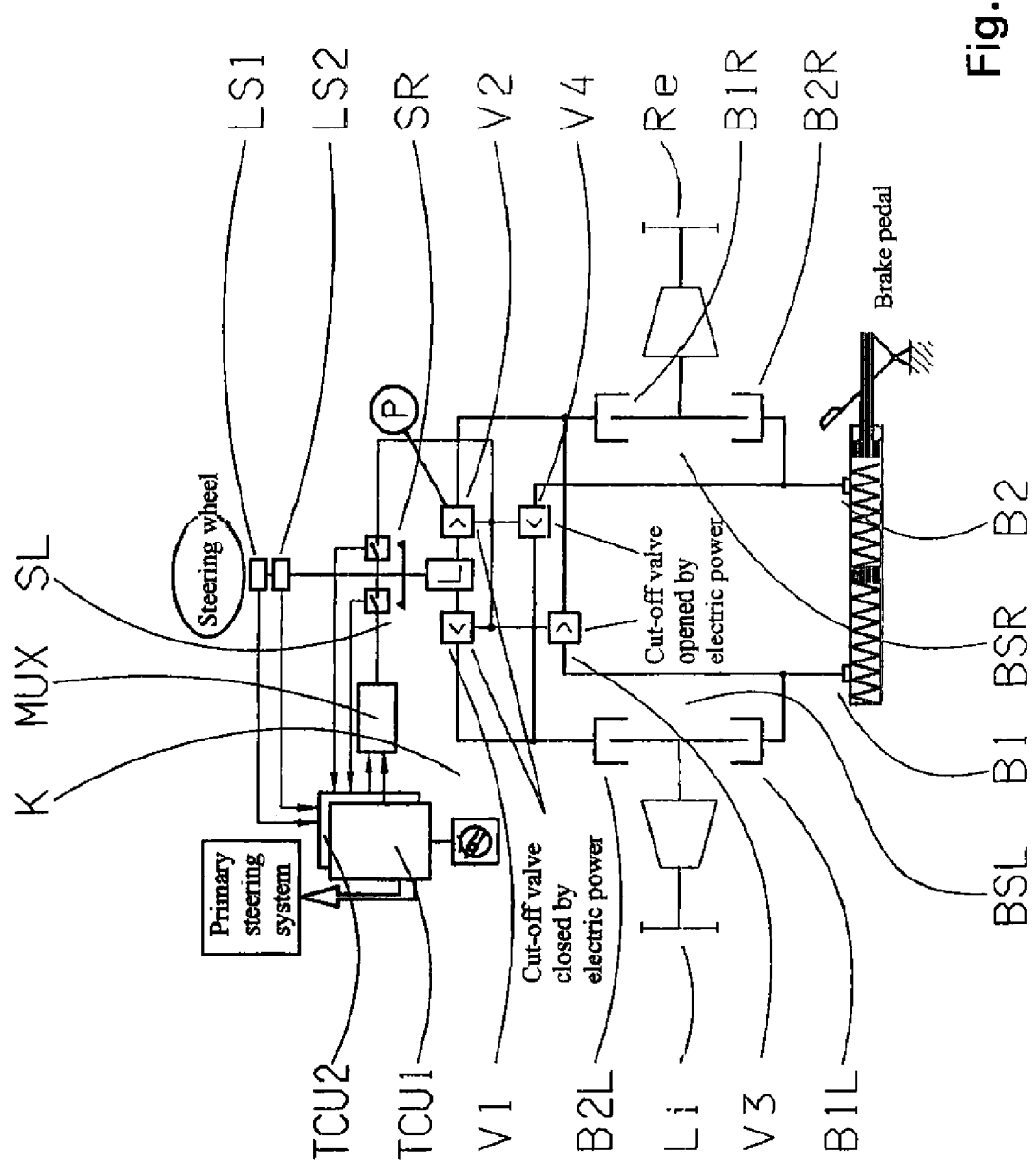
FIG. 1 is a diagram illustrating the principle of a preferred embodiment of the steering system according to the invention.

Referring to FIG. 1, a steering system, according to the invention, comprises a steering valve L that can be controlled by the steering axle which, in the event of primary steering system failure, engages the brakes of the vehicle in such a manner that turning the steering axle results in a braking action on the track on the inside of the curve. The steering valve L can be actuated by two cut-off valves V1, V2 (connected to the valve L), which are opened by spring force and closed electrically, the valves V1, V2 acting respectively on one brake circuit B1, B2 when in the open condition.

In addition, two further cut-off valves V3, V4 are provided, each respectively arranged in the brake circuit B1, B2 which are closed by spring force and opened electrically and which, in the closed condition, cut off the respective half of the brake circuit B1, B2 so that the valves V1, V2 in their open condition can act, respectively, on the brake device on one side of a vehicle B2L or B1R.

In this case, when the valves V3, V4 are closed the connection of the first cut-off valves V1, V2 to a right-hand and left-hand brake calliper B2R or B1L respectively is interrupted so that the valves V1, V2 act respectively on a left-hand or a right-hand brake calliper B2L and B1R, respectively.

The cut-off valves V1, V2, V3, V4 are electrically connected to two electric emergency steering function switches SL, SR with a mechanical holding function connected in series, these emergency steering function switches being actuated respectively by a high torque on the steering wheel in one direction or the other. The emergency steering function switches SL, SR are connected to the control unit of the primary steering system.

In FIG. 1, a left-hand brake disc is indexed BSL and a right-hand brake disc is indexed BSR. Also, steering angle sensors connected to the control system are indexed LS1 and LS2, and a multiplexer indexed as Mux is connected between a control system and a steering emergency function switches SL, SR.

In a normal situation, the switches SL and SR are closed. By virtue of these two switches, the valves V1 and V2 are kept closed by voltage supplied by the control unit. In contrast, the valves V3 and V4 located in the normal brake circuits B1, B2 are kept open. This means that when the brake pedal is actuated, both brake circuits B1, B2 are active.

If the control unit TCU of the primary steering system is no longer supplying voltage to the switches SL and SR (electric actuation of the steering valve), then the voltage fed to the valves V1 to V4 is cut off. This opens the valves V1 and V2 and closes the valves V3 and V4. The controllable steering valve L on the steering wheel can then act upon the brakes. In this case, valve V1 acts upon the left-hand brake calliper B2L and valve V2 upon the right-hand brake calliper B1R. The brake circuits B1 and B2 still act respectively only on the brake callipers B1L and B2R, since the connection of the brake calliper B1R and the brake calliper B2L is interrupted by valves V3 and V4, respectively. Thus, on actuating the brake pedal, the action of the brakes is halved. Accordingly, by virtue of the controllable steering valve L, it is now possible to actuate the brakes as a function of the steering deflection amplitude. (In the Figure, a pressure reservoir for a valve L is indexed P.) This produces a different left/right brake action on the tracks and correspondingly a rotation (yaw-type) torque on the vehicle, whereby the vehicle can be steered.

If there is a failure of the electric or mechanical drive components of the primary steering system, the deficient steering is perceived by the driver. In such a case it is assumed that the driver will "automatically" (intuitively) exert greater force/higher steering torque on the steering wheel.

When a definable steering torque threshold to the left or to the right is exceeded, the emergency steering function switches SL or SR mechanically coupled to the steering wheel are opened. By way of an answer-back signal from the emergency switch SL or SR, the actuation of the emergency steering mechanism is notified to the control unit TCU; the valves V1 and V2 are opened and the valves V3 and V4 are closed so that the vehicle can be steered by way of the steering valve L as described earlier.

In this function, it is necessary for the emergency steering function switches SL and SR to have a self-maintaining function. This means that once the function has been activated, the switches SL or SR remain active. The redundant steering system can only be reset when the vehicle is stationary and the ignition switched off. The switches SL or SR must then be closed manually.

Figure 2:
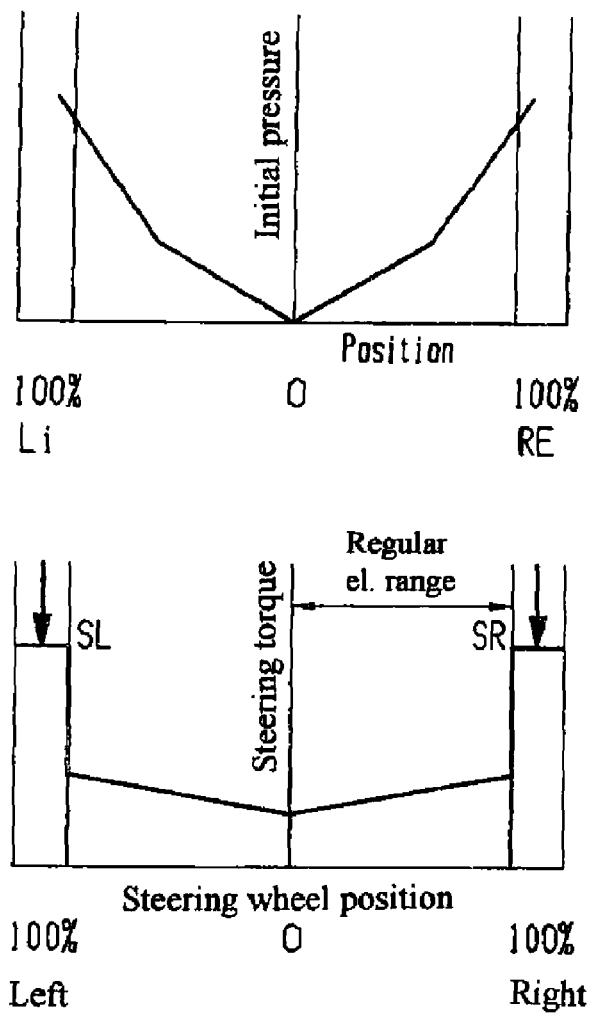
FIGS. 2A, 2B are a hydraulic characteristic of the controllable steering valve as a function of the position of the steering wheel, and an illustration of the actuation of the emergency steering function switches according to the invention.

FIG. 2B shows an example of a characteristic of the controllable steering valve L. As can be seen from the Figure, the initial pressure attainable or the braking power attainable is a function of the position of the steering axle or steering wheel. In each case, the maximum initial pressure is produced at the end limit of the steering wheel's travel.

In FIG. 2A, which shows the steering torque as a function of the steering wheel's position, the actuation of the emergency steering function switches SL or SR is illustrated. This takes place when the regular range is overstepped and a definable steering torque threshold to the left or to the right is exceeded. The arrows indicate the actuation of the emergency steering function switch on each respective side.

To ensure sufficient safety, the control unit TCU must recognize faults in the primary steering system and as a result switch over from the electric steering function to the mechanical-hydraulic, steering function according to the invention. Accordingly, the electric system must basically be designed with two-fold redundancy so that faults can be recognized. If both control units fail, the mechanical-hydraulic steering is also activated.

To achieve greater availability, in an advantageous further development of the invention, a switch K ("battle switch") is provided, which can be actuated by the driver. By actuating this switch, all the monitoring functions in the control unit TCU are de-activated since, in battle situations, component protection is not important.

Advantageously, the switch can be made with several positions so that a driver can decide whether TCU1 or TCU2 is disconnected. This makes it unnecessary to incorporate a third switch to decide that since the driver is better able to decide whether he can still steer with TCU1 or TCU2.

Figure 3:
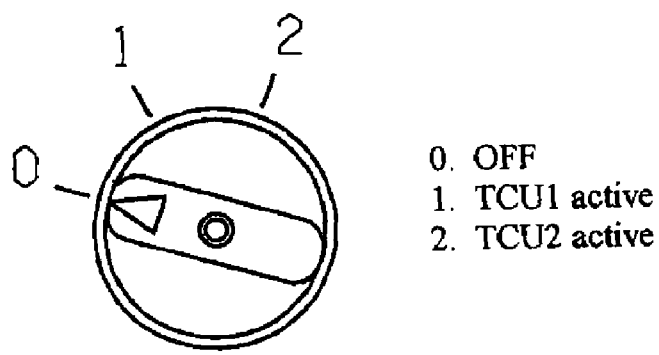
FIG. 3 is a schematic representation of the "battle switch" provided according to the invention.

A possible switch position of the battle switch is the object of FIG. 3. In position 0, both controls are disconnected; position 1 corresponds to the activation of TCU1 and position 2 corresponds to the activation of TCU2. When all the control units TCU1, TCU2 are disconnected, the steering system, as described above, is activated.

REFERENCE NUMERALS

L steering valve
LS1 steering angle sensor
LS2 steering angle sensor
V1 cut-off valve
V2 cut-off valve
V3 cut-off valve
V4 cut-off valve
SL emergency steering function switch
SR emergency steering function switch
B1 first brake circuit
B2 second brake circuit
B1R brake caliper
B1L brake caliper
B2R brake caliper
B2L brake caliper
BSL brake disc
BSR brake disc
Mux multiplexer
P pressure reservoir
K battle switch
TCU1 control unit
TCU2 control unit

The invention claimed is:

1. A steering system for tracked vehicles comprising two brake circuits which are actuated on failure of a primary steering system, the steering system comprises a steering valve (L) that is controlled by the steering axle and acts upon the two brake circuits of the vehicle if the primary steering system fails, such that rotation of the steering axle results in a braking action upon a track on an inside of a curve, the steering valve (L) is actuated by two cut-off valves (V1, V2) that are opened by a spring force and closed electrically such that, when open, the two cut-off valves (V1, V2) act upon a respective brake mechanism on one side of the vehicle.

2. The steering system for tracked vehicles according to 1, wherein the steering system is actuated either electrically by interrupting a supply voltage to the two cut-off valves (V1, V2) or mechanically, the two cut-off valves (V1, V2) being electrically connected to electric emergency steering function switches (SL, SR) with a mechanical holding function connected in series, such that the emergency steering function switches (SL, SR) are actuated by a high torque respectively in one direction or the other on a steering wheel to enable mechanical activation of the steering system.

3. The steering system for tracked vehicles according to claim 1, wherein the steering valve (L) is actuated by two cut-off valves (V1, V2) which are opened by spring force and closed electrically such that when open, the valves (V1, V2) act respectively upon a brake circuit (B1, B2), two further cut-off valves (V3, V4) are arranged respectively in the brake circuit (B1, B2) and are closed by spring force and opened electrically, when closed the further cut-off valves (V3, V4) cut off a respective half of the brake circuit (B1, B2), so enabling the valves (V1, V2) when open to respectively act upon the brake mechanism on one side of the vehicle (brake calliper B2L or brake calliper B1R).

4. The steering system for tracked vehicles according to claim 3, wherein when the further cut-off valves (V3, V4) are closed, a connection of the valves (V1, V2) respectively to a right-hand brake caliper (B2R) or a left-hand brake calliper (B1L) is interrupted.

5. The steering system for tracked vehicles according to claim 3, wherein the cut-off valves (V1, V2) and the further cut-off valves (V3, V4) are electrically connected to two electric emergency steering function switches (SL, SR) with a mechanical holding function arranged in series and connected to a control unit (TCU) of the primary steering system, such that the emergency steering function switches (SL, SR) are actuated by a high torque on a steering wheel respectively in one direction or another.

6. The steering system for tracked vehicles according to claim 5, wherein the steering system is activated when the control unit (TCU) of the primary steering system interrupts a supply voltage to the emergency steering function switches (SL, SR), the cut-off valves (V1, V2) and the further cut-off valves (V3, V4), such that the cut-off valves (V1, V2) are opened and the further cut-off valves (V3, V4) are closed so that, via the cut-off valves (V1, V2), the controllable steering valve (L) acts upon brakes of the vehicle, a first valve (V1) of the cut-off valves (V1, V2) acting upon the left-hand brake calliper (B2L) and a second valve (V2) of the cut-off valves (V1, V2) acting upon the right-hand brake calliper (B1R).

7. The steering system for tracked vehicles according to claim 5, wherein the steering system is activated mechanically when a definable steering torque threshold on the steering wheel to the left or to the right has been exceeded whereby, the emergency steering function switches (SL, SR) mechanically coupled to the steering wheel are opened and cause the supply voltage to the cut-off valves (V1, V2) and the further cut-off valves (V3, V4) to be interrupted, as a result of which the cut-off valves (V1, V2) are opened and the further cut-off valves (V3, V4) are closed so that, via the cut-off valves (V1, V2), the controllable steering valve (L) acts upon the brakes of the vehicle, a first valve (V1) of the cut-off valves (V1, V2) acting upon the left-hand brake calliper (B2L) and a second valve (V2) of the cut-off valves (V1, V2) acting upon the right-hand brake calliper (B1R).

8. The steering system for tracked vehicles according to claim 1, wherein an electrical system of the primary steering system of the vehicle is one of designed with two-fold redundancy or comprises two control units (TCU1, TCU2) to enable recognition of faults and consequent activation of the steering system.

9. The steering system for tracked vehicles according to claim 8, wherein the steering system further comprises a switch (K) that is operated by a driver, so that the two control units (TCU1, TCU2) of the primary steering system of the vehicle are one of selectively disconnected or activated, and when both of the two control units (TCU1, TCU2) are disconnected, the steering system is activated.

10. A steering system for tracked vehicles comprising two brake circuits which are actuated on failure of a primary steering system, the steering system comprises a steering valve (L) that is controlled by the steering axle and acts upon the two brake circuits of the vehicle if the primary steering system fails, such that rotation of the steering axle results in a braking action upon a track on an inside of a curve, the steering valve (L) is actuated by two cut-off valves (V1, V2) that are opened by a spring force and closed electrically such that, when open, the two cut-off valves (V1, V2) act upon a respective brake mechanism on one side of the vehicle, the steering system is actuated either electrically by interrupting a supply voltage to the two cut-off valves (V1, V2) or mechanically, the two cut-off valves (V1, V2) being electrically connected to electric emergency steering function switches (SL, SR) with a mechanical holding function connected in series, such that the emergency steering function switches (SL, SR) are actuated by a high torque respectively in one direction or the other on a steering wheel to enable mechanical activation of the steering system.

11. A steering system for tracked vehicles comprising two brake circuits which are actuated on failure of a primary steering system, the steering system comprises a steering valve (L) that is controlled by the steering axle and acts upon the two brake circuits of the vehicle if the primary steering system fails, such that rotation of the steering axle results in a braking action upon a track on an inside of a curve, the steering valve (L) is actuated by two cut-off valves (V1, V2) which are opened by spring force and closed electrically such that when open, the cut-off valves (V1, V2) act respectively upon a brake circuit (B1, B2), two further cut-off valves (V3, V4) are arranged respectively in the two brake circuits (B1, B2) and are closed by spring force and opened electrically, when closed the further cut-off valves (V3, V4) cut off a respective half of the brake circuit (B1, B2), so enabling the cut-off valves (V1, V2) when open to respectively act upon the brake mechanism on one side of the vehicle (brake calliper B2L or brake calliper B1R), the cut-off valves (V1, V2) and the further cut-off valves (V3, V4) are electrically connected to two electric emergency steering function switches (SL, SR) with a mechanical holding function arranged in series and connected to a control unit (TCU) of the primary steering system, such that the emergency steering function switches (SL, SR) are actuated by a high torque on a steering wheel respectively in one direction or another.

12. The steering system for tracked vehicles according to claim 11, wherein the steering system is activated when the control unit (TCU) of the primary steering system interrupts a supply voltage to the emergency steering function switches (SL, SR), the cut-off valves (V1, V2) and the further cut-off valves (V3, V4), such that the cut-off valves (V1, V2) are opened and the further cut-off valves (V3, V4) are closed so that, via the cut-off valves (V1, V2), the controllable steering valve (L) acts upon brakes of the vehicle, a first valve (V1) of the cut-off valves (V1, V2) acting upon the left-hand brake calliper (B2L) and a second valve (V2) of the cut-off valves (V1, V2) acting upon the right-hand brake calliper (B1R).

13. The steering system for tracked vehicles according to claim 11, wherein the steering system is activated mechanically when a definable steering torque threshold on the steering wheel to the left or to the right has been exceeded whereby, the emergency steering function switches (SL, SR) mechanically coupled to the steering wheel are opened and cause the supply voltage to the cut-off valves (V1, V2) and the further cut-off valves (V3, V4) to be interrupted, as a result of which the cut-off valves (V1, V2) are opened and the further cut-off valves (V3, V4) are closed so that, via the cut-off valves (V1, V2), the controllable steering valve (L) acts upon the brakes of the vehicle, a first valve (V1) of the cut-off valves (V1, V2) acting upon the left-hand brake calliper (B2L) and a second valve (V2) of the cut-off valves (V1, V2) acting upon the right-hand brake calliper (B1R).

\* \* \* \* \*